US006980209B1

(12) United States Patent
Donham et al.

(10) Patent No.: US 6,980,209 B1
(45) Date of Patent: Dec. 27, 2005

(54) METHOD AND SYSTEM FOR SCALABLE, DATAFLOW-BASED, PROGRAMMABLE PROCESSING OF GRAPHICS DATA

(75) Inventors: Christopher D. S. Donham, San Mateo, CA (US); Alexander Lev Minkin, Los Altos, CA (US); Bryon Nordquist, San Jose, CA (US); Edward A. Hutchins, Mountain View, CA (US); Mark Tian, Mountain View, CA (US); George Easton Scott III, Dublin, CA (US)

(73) Assignee: NVIDIA Corporation, Santa Clara, CA (US)

( * ) Notice: Subject to any disclaimer, the term of this patent is extended or adjusted under 35 U.S.C. 154(b) by 528 days.

(21) Appl. No.: 10/172,174

(22) Filed: Jun. 14, 2002

(51) Int. Cl.[7] .............................................. G06T 15/50
(52) U.S. Cl. ....................... 345/426; 345/582; 345/506
(58) Field of Search ................................. 345/426, 582, 345/583, 506, 690–697

(56) References Cited

U.S. PATENT DOCUMENTS

| | | | | |
|---|---|---|---|---|
| 5,706,415 | A | * | 1/1998 | Kelley et al. ............... 345/426 |
| 6,198,488 | B1 | * | 3/2001 | Lindholm et al. ........... 345/426 |
| 6,229,553 | B1 | * | 5/2001 | Duluk et al. ................ 345/506 |
| 6,333,744 | B1 | | 12/2001 | Kirk et al. .................. 345/506 |
| 6,646,653 | B2 | * | 11/2003 | San et al. .................... 345/649 |
| 2002/0174318 | A1 | * | 11/2002 | Stuttard et al. .............. 712/13 |
| 2004/0085313 | A1 | * | 5/2004 | Moreton et al. ............. 345/423 |

(Continued)

OTHER PUBLICATIONS

Peercy, Mark S., Marc Alano, John Airey, and P. Jeffery Ungar, "Interactive Multi-pass Programmable Shading", Proceedings of SIGGRAPH 2000(New Orleans, Louisiana, Jul. 23-28, 2000). In Computer Graphics, Annual Conference Series, ACM SIGGRAPH, 2000).*

(Continued)

*Primary Examiner*—Ulka J. Chauhan
*Assistant Examiner*—Daniel F. Hajnik
(74) *Attorney, Agent, or Firm*—Moser, Patterson & Sheridan, L.L.P.

(57) ABSTRACT

A scalable pipelined pixel shader that processes packets of data and preserves the format of each packet at each processing stage. Each packet is an ordered array of data values, at least one of which is an instruction pointer. Each member of the ordered array can be indicative of any type of data. As a packet progresses through the pixel shader during processing, each member of the ordered array can be replaced by a sequence of data values indicative of different types of data (e.g., an address of a texel, a texel, or a partially or fully processed color value). Information required for the pixel shader to process each packet is contained in the packet, and thus the pixel shader is scalable in the sense that it can be implemented in modular fashion to include any number of identical pipelined processing stages and can execute the same program regardless of the number of stages. Preferably, each processing stage is itself scalable, can be implemented to include an arbitrary number of identical pipelined instruction execution stages known as microblenders, and can execute the same program regardless of the number of microblenders. The current value of the instruction pointer (IP) in a packet determines the next instruction to be executed on the data contained in the packet. Any processing unit can change the instruction that will be executed by a subsequent processing unit by modifying the IP (and/or condition codes) of a packet that it asserts to the subsequent processing unit. Other aspects of the invention include graphics processors (each including a pixel shader configured in accordance with the invention), methods and systems for generating packets of data for processing in accordance with the invention, and methods for pipelined processing of packets of data.

64 Claims, 4 Drawing Sheets

U.S. PATENT DOCUMENTS

2005/0078117 A1 * 4/2005 Suzuoki et al. ............. 345/502

OTHER PUBLICATIONS

"A real-time procedural shading system for programmable graphics hardware" Kekoa Proudfoot, William R. Mark, Svetoslav Tzvetkov, Pat Hanrahan Aug. 2001. Proceedings of the 28th annual conference on Computer graphics and interactive techniques.*

Foley et al., "Computer Graphics: Principles and Practice", Addison Wesley, 2nd ed. in C, 1996, pp. 874-876, p. 879.*

* cited by examiner

METHOD AND SYSTEM FOR SCALABLE, DATAFLOW-BASED, PROGRAMMABLE PROCESSING OF GRAPHICS DATA

TECHNICAL FIELD OF THE INVENTION

The present invention relates to graphics chips (graphics processors implemented as integrated circuits) and systems including graphics processors, and to methods for providing programmability in a computer graphics processing pipeline.

BACKGROUND OF THE INVENTION

In three dimensional graphics, surfaces are typically rendered by assembling a plurality of polygons in a desired shape. The polygons (which are typically triangles) are defined by vertices, and each vertex is defined by three dimensional coordinates in world space, by color values, and by texture coordinates. Vertices can have other attributes, such as surface normals.

The surface determined by an assembly of polygons is typically intended to be viewed in perspective. To display the surface on a computer monitor, the three dimensional world space coordinates of the vertices are transformed into screen coordinates in which horizontal and vertical values (x, y) define screen position and a depth value z determines how near a vertex is to the screen and thus whether that vertex is viewed with respect to other points at the same screen coordinates. The color values define the brightness of each of red/green/blue (r, g, b) color at each vertex and thus the color (often called diffuse color) at each vertex. Texture coordinates (u, v) define texture map coordinates for each vertex on a particular texture map defined by values stored in memory.

The world space coordinates for the vertices of each polygon are processed to determine the two-dimensional coordinates at which those vertices are to appear on the two-dimensional screen space of an output display. If a triangle's vertices are known in screen space, the positions of all pixels of the triangle vary linearly along scan lines within the triangle in screen space and can thus be determined. Typically, a rasterizer uses (or a vertex processor and a rasterizer use) the three-dimensional world coordinates of the vertices of each polygon to determine the position of each pixel of each surface ("primitive" surface") bounded by one of the polygons.

The color values of each pixel of a primitive surface (sometimes referred to herein as a "primitive") vary linearly along lines through the primitive in world space. A rasterizer performs (or a rasterizer and a vertex processor perform) processes based on linear interpolation of pixel values in screen space, linear interpolation of depth and color values in world space, and perspective transformation between the two spaces to provide pixel coordinates and color values for each pixel of each primitive. The end result of this is that the rasterizer outputs a sequence red/green/blue color values (conventionally referred to as diffuse color values) for each pixel of each primitive.

One or more of the vertex processor, the rasterizer, and a texture processor compute texture coordinates for each pixel of each primitive. The texture coordinates of each pixel of a primitive vary linearly along lines through the primitive in world space. Thus, texture coordinates of a pixel at any position in the primitive can be determined in world space (from the texture coordinates of the vertices) by a process of perspective transformation, and the texture coordinates of each pixel to be displayed on the display screen can be determined. A texture processor can use the texture coordinates (of each pixel to be displayed on the display screen) to index into a corresponding texture map to determine texels (texture color values at the position defined by the texture coordinates for each pixel) to vary the diffuse color values for the pixel. Often the texture processor interpolates texels at a number of positions surrounding the texture coordinates of a pixel to determine a texture value for the pixel. The end result of this is that the texture processor generates data determining a textured version of each pixel (of each primitive) to be displayed on the display screen.

A texture map typically describes a pattern to be applied to a primitive to vary the color of each pixel of the primitive in accordance with the pattern. The texture coordinates of the vertices of the primitive fix the position of the vertices of a polygon on the texture map and thereby determine the texture detail applied to each of the other pixels of the primitive in accordance with the pattern.

A texture applied to a surface in space can have a wide variety of characteristics. A texture can define a pattern such as a stone wall. It can define light reflected from positions on the surface. It can describe the degree of transparency of a surface and thus how other objects are seen through the surface. A texture can provide characteristics such as dirt or scratches which make a surface appear more realistic. A number of other variations can be provided which fall within the general description of a texture. In theory, a number of different textures can be applied to the pixels of any primitive. Some graphics processors capable of applying multiple textures to the pixels of a primitive progress through a series of steps in which data describing the pixels of each primitive are generated, a first texture is mapped to the pixels of the primitive using the texture coordinates of the vertices, texels to be combined with each pixel of the primitive (to vary the color of each such pixel in accordance with the first texture) are generated or retrieved, the texels describing the first texture and the color data for the pixels of the primitive are blended to generate textured pixel data. Then, an additional texture is mapped to the same primitive using the texture coordinates of the vertices, texels for the additional texture are generated or retrieved, and the texels describing the additional texture are blended with the previously generated textured pixel data to generate multiply textured pixel data.

U.S. Pat. No. 6,333,744, issued on Dec. 25, 2001 and assigned to the assignee of the present application, describes a graphics processor including a pipelined pixel shader that can be operated to blend multiple textures with each pixel of a primitive in a single pass through the pipeline.

Some conventional pipelined pixel shaders can recirculate data through their stages. For example, to apply N textures (where N=1 or N=2) to each pixel of a primitive, such a pixel shader operates in response to a program to pass each pixel once through each stage. To apply 2N textures to each pixel of the same primitive, the shader operates in response to another program to pass each pixel once through each stage (to generate partially textured pixels by combining first texture data with each pixel) and then recirculate each partially textured pixel through the shader (by passing each partially textured pixel through each stage a second time) to combine additional texture data with each partially textured pixel.

Until the present invention, a pipelined pixel shader had not been designed with a scalable architecture in the sense that it could be implemented in modular fashion with any number of pipelined processing stages and still be operable in response to the same program (regardless of the number of stages). The inventors have recognized how to design a pipelined pixel shader with a scalable architecture so that it can be implemented with a low number of identical processing stages for applications in which it is acceptable to operate the pixel shader (in response to a program) with a high degree of data recirculation through each stage in order to perform a large number of texturing operations on each pixel, or with a high number of the same processing stages for applications in which it is desired to operate the pixel shader (in response to the same program) with no more than a low degree of data recirculation through each stage in order to perform the same number of texturing operations on each pixel.

Nor had a pipelined pixel shader been designed, until the present invention, to have a scalable architecture and also to be capable of executing conditional jumping and branching, looping, and other high-level flow control constructs. Nor had a pipelined pixel shader been designed, until the present invention, with each of its processing stages having a modular design so that each processing stage can be implemented in a scalable manner to include any number of identical pipelined instruction execution stages and be operable to execute the same sequence of instructions regardless of the number of instruction execution stages.

SUMMARY OF THE INVENTION

In a class of embodiments, the invention is a scalable, pipelined pixel shader that processes packets of data in response to program instructions and preserves the format of each packet at each processing stage. All (or substantially all) the information required for the pixel shader to process each packet (except for the program instructions themselves) is contained in the packet. The instructions, or codes indicative of the instructions, are typically pre-loaded into the pixel shader. Each packet is an ordered array of data values, and at least one of the data values is an instruction pointer. The array can consist of bits transmitted in parallel during a single clock cycle, a stream of serially transmitted bits (each bit transmitted during a different clock cycle), or two or more parallel streams of serially transmitted bits (in general, each stream can consist of a different number of bits). Although the basic format of the ordered array (and thus the format of the packet) is typically preserved during processing, each of its data values can be indicative of any type of data. For example, during different cycles of a processing operation, one member of the ordered array can be indicative of an address of a texel, then a texel, then a color value for a color pixel, then a partially processed color value, and then a fully processed color value. Further, in some embodiments, data values are added or deleted from the ordered array as a result of processing, causing the array to grow or shrink as it is passed from one stage to the next. Each stage of a typical embodiment of the pixel shader is configured to respond to the instruction to which a packet's instruction pointer points by performing one of a number of predetermined operations on data in the packet (texture data, pixel data, and/or textured pixel data) and optionally also other data retrieved in response to the pointer, including texturing operations (in which texture data and pixel data are combined to produce textured pixel data) and other operations (such as format conversion on individual texels or color values). Typically, the inventive pixel shader includes a local memory into which program instructions are pre-loaded, and the pixel shader retrieves an instruction from the local memory for each packet in response to the packet's instruction pointer.

Each packet typically includes state information for at least one pixel, as well as an instruction pointer that points to the next instruction to be performed on data of the packet. The state information includes the color values of each pixel, and can also include at least one condition code useful as an instruction predicate, a value to indicate whether or not the pixel should be added into the frame buffer at the end of processing, at least one texel to be combined with the color values of a pixel, intermediate results from instructions previously executed on the packet, coordinates of each pixel in "display screen" space, and/or other data.

Since all (or substantially all) the information required to process each packet is contained within the packet, a pixel shader embodying the invention can be implemented with scalable architecture in the sense that it can be implemented in modular fashion with any number of identical pipelined processing stages and be operable in response to the same program regardless of the number of stages. If implemented with a low number of processing stages, each stage is typically operated with a high degree of recirculation resulting in less system performance but also less cost of implementation. If implemented with a high number of processing stages, each stage is typically operated with a low degree of recirculation resulting in higher system performance but also higher cost of implementation.

Each processing stage can itself be implemented with scalable architecture, in the sense that it can be implemented to include an arbitrary number of identical pipelined instruction execution stages (sometimes referred to herein as "microblenders") and be operable in response to the same set of instructions regardless of the number of instruction execution stages. If a processing stage is implemented with a low number of microblenders, each microblender is typically operated with a high degree of recirculation resulting in less performance but requiring less chip area to implement. If the processing stage is implemented with a high number of microblenders, each microblender is typically operated with a low degree of recirculation resulting in more performance but requiring more chip area to implement.

All (or substantially all) information about the current level of processing of a pixel being processed (e.g., an RGBA pixel which had an initial set of red, green, blue, and alpha components when input to the pixel shader) is keyed off the current value of the instruction pointer ("IP") in the packet containing the pixel. The current IP value (sometimes together with one or more condition codes also included in the packet) determines the next instruction to be executed on the data contained in the packet. The pixel shader executes each operation determined by the current value of IP, and also updates the value of IP. Since the updated IP in each packet points to the next instruction to be executed on data in the packet, any processing unit of the pixel shader can change the instruction that will be executed by a subsequent processing unit by modifying the IP (and/or condition codes) of a packet to be asserted to the subsequent processing unit. Thus, the inventive pixel shader can implement jump, branch, conditional jump, conditional branch, and loop instructions, as well as other high-level flow control constructs.

Typically, the pixel shader of the invention is implemented as a portion of a graphics processing chip.

Other aspects of the invention include graphics processors (each including a pipelined pixel shader configured in accordance with the invention, and each typically implemented as an integrated circuit), methods and systems for generating packets of data (for processing by a pixel shader in accordance with the invention), and methods for pipelined processing of packets of data. In a class of embodiments, the invention is a pipelined graphics processor that includes a rasterizer stage, a pipelined pixel shader configured in accordance with the invention, and optionally also a vertex processor, a pixel processor, and a frame buffer.

DETAILED DESCRIPTION OF THE PREFERRED EMBODIMENTS

In a class of embodiments, the invention is a scalable, pipelined pixel shader. The expression "pixel shader" is conventionally used to denote a pixel rendering engine that combines pixel data (including color values and lighting information, typically generated by a rasterizer) and texture data (typically indicative of addresses of texels) to produce textured pixel data. A pixel shader typically includes circuitry for retrieving texels from a texture memory (in response to the texture data asserted to the pixel shader), and blending the texels with the color values of the pixels to be textured.

Figure 1:
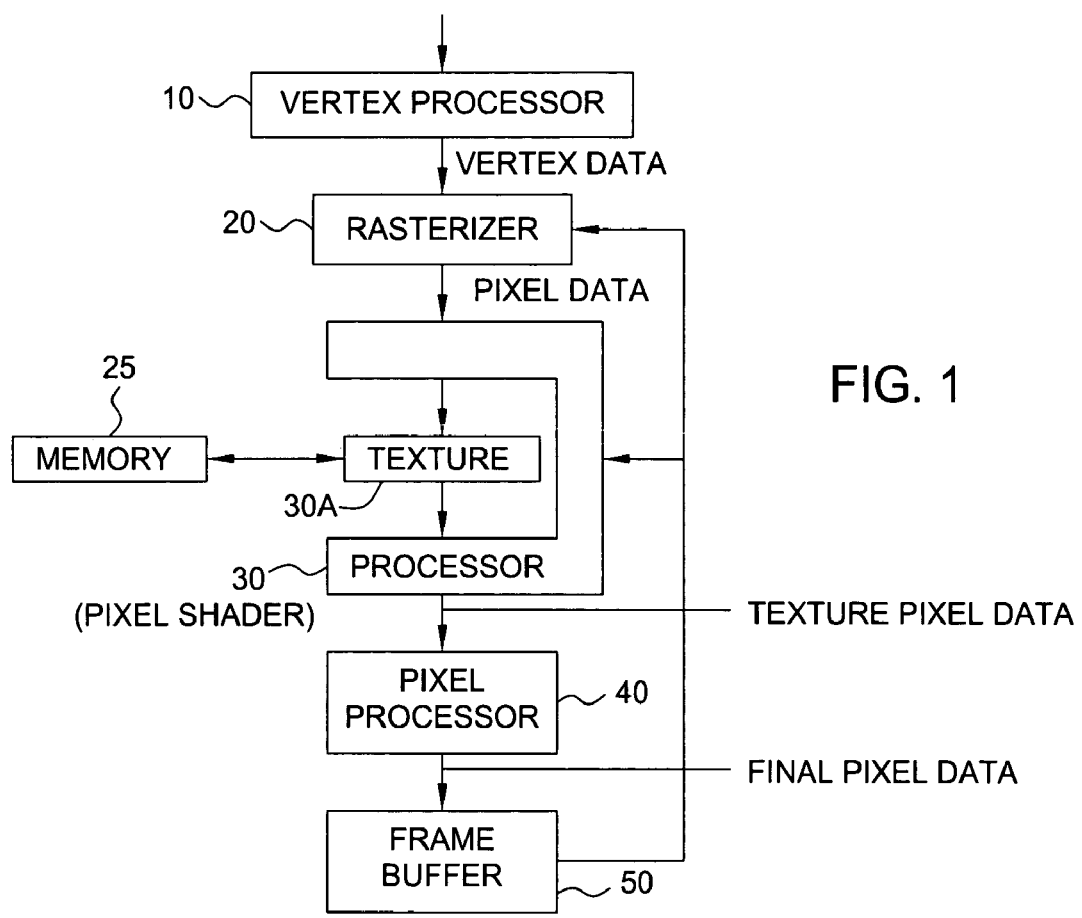
FIG. 1 is a block diagram of a system that embodies the invention.

FIG. 1 is a block diagram of a pipelined graphics processing system implemented in accordance with the present invention. Preferably, the FIG. 1 system is implemented as an integrated circuit (including other elements not shown in FIG. 1), but alternatively at least two portions thereof (e.g., frame buffer 50, and all other elements of FIG. 1) are implemented as separate chips (or portions of separate chips). Vertex processor 10 of FIG. 1 generates vertex data indicative of the coordinates of the vertices of each primitive (typically a triangle) of each image to be rendered, and attributes (e.g., color values) of each vertex.

Rasterizer 20 generates pixel data in response to the vertex data from processor 10. The pixel data are indicative of the coordinates of a full set of pixels for each primitive, and attributes of each pixel (e.g., color values for each pixel and values that identify one or more textures to be blended with each set of color values). Rasterizer 20 generates packets that include the pixel data and asserts the packets to pixel shader 30. Each packet can but need not have the format to be described with reference to FIG. 3. Each packet includes the pixel data for one or more pixels and also all (or substantially all) information that determines the state associated with each such pixel. The state information for a pixel includes a pointer to the next instruction to be executed by pixel shader 30 to accomplish the appropriate processing on the pixel, condition codes that can be used as predicates in subsequent instructions, a value to indicate whether or not the pixel should be added into the frame buffer at the end of processing, and a set of arbitrary-use bit locations that can contain color values for pixels, iterated vertex data, texels (e.g., color data from a texture map), intermediate results from previous pixel shader instructions, or other data.

Pixel shader 30 includes texture subsystem 30A, which provides texels that are processed (with other data) by the remaining portion of the pixel shader (labeled "processor" in FIG. 1). Texture subsystem 30A, is coupled to memory 25, and typically includes a texture cache memory. Typically, pixel shader 30 combines the pixel data in each packet received from rasterizer 20 with texture data determined during the processing of the packet. For example, a packet specifies one or more texture coordinates, and pixel shader 30 implements an algorithm to generate a texel average in response to the specified texture coordinates (by causing texture subsystem 30A to retrieve the texels from memory 25, and computing an average of the texels of each texture map) and to generate textured pixel data by combining the pixel with each of the texel averages. In typical implementations, pixel shader 30 can perform various operations in addition to (or instead of) texturing each pixel, such as one or more of the well known operations of format conversion (e.g. floating point to fixed point conversion or vice versa), input swizzle (e.g., duplicating and/or reordering an ordered set of components of a pixel), scaling and biasing, inversion (and/or one or more other logic operations), clamping, and output swizzle.

When processing each packet, pixel shader 30 updates elements of the packet (e.g., replaces color values with partially processed color values, or with fully processed color values indicative of blends of original color values and texels) but preserves the basic packet structure. Thus, when pixel shader 30 has completed all required processing operations on a packet, it has generated a modified version of the packet (an "updated" packet). In some implementations, pixel shader 30 asserts each updated packet to pixel processor 40, and pixel processor 40 performs additional processing on the updated packets while preserving the basic packet structure. Alternatively, pixel processor 40 performs the required additional processing on textured pixel data generated by pixel shader 30, but after the data have been extracted from the updated packets generated in shader 30 and without preserving packet structure. For example, an input stage of pixel processor 40 extracts textured pixel data from updated packets received from pixel shader 30, and asserts the extracted textured pixel data to other circuitry within processor 40 that performs the required processing thereon.

In variations on the FIG. 1 embodiment, pixel processor 40 is omitted. In this case, pixel shader 30 is coupled directly to frame buffer 50, pixel shader 30 performs all required processing of the pixels generated by rasterizer 20 (by operating on packets containing the pixels to generate updated packets), and pixel shader 30 is configured to extract the fully processed pixels from the updated packets and assert the fully processed pixels to frame buffer 50.

Pixel shader 30 can perform various operations in addition to (or instead of) texturing each pixel, such as one or more of the conventional operations of culling, frustum clipping, polymode operations, polygon offsetting, and fragmenting. Alternatively, pixel shader 30 performs all required texturing operations and pixel processor 40 performs some or all required non-texturing operations for each pixel.

Since all (or substantially all) the information required to process each pixel (in a packet) is contained in the packet, pixel shader 30 (and other embodiments of the inventive system) can easily be "scaled" in the sense that it can be implemented with any number of pipelined processing stages (e.g., any number of stages identical to stage 31 of FIG. 2), including a low number of processing stages (each operated with a high degree of recirculation) or a high number of processing stages (each operated with a low degree of recirculation).

Typically, each processing stage is itself scalable in the sense that it comprises an arbitrary number of pipelined instruction execution stages (sometimes referred to herein as "microblenders"), and can be implemented with a low number of instruction execution stages (each operated with a high degree of recirculation) to a high number of instruction execution stages (each operated with a low degree of recirculation).

Figure 3:
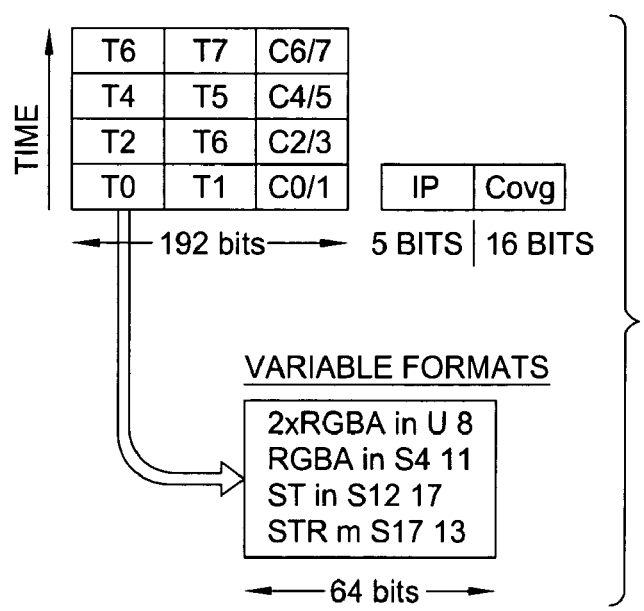
FIG. 3 is a diagram of the format of a portion of one data packet processed by pixel shader 30 in a typical implementation of the FIG. 1 system.
Figure 2:
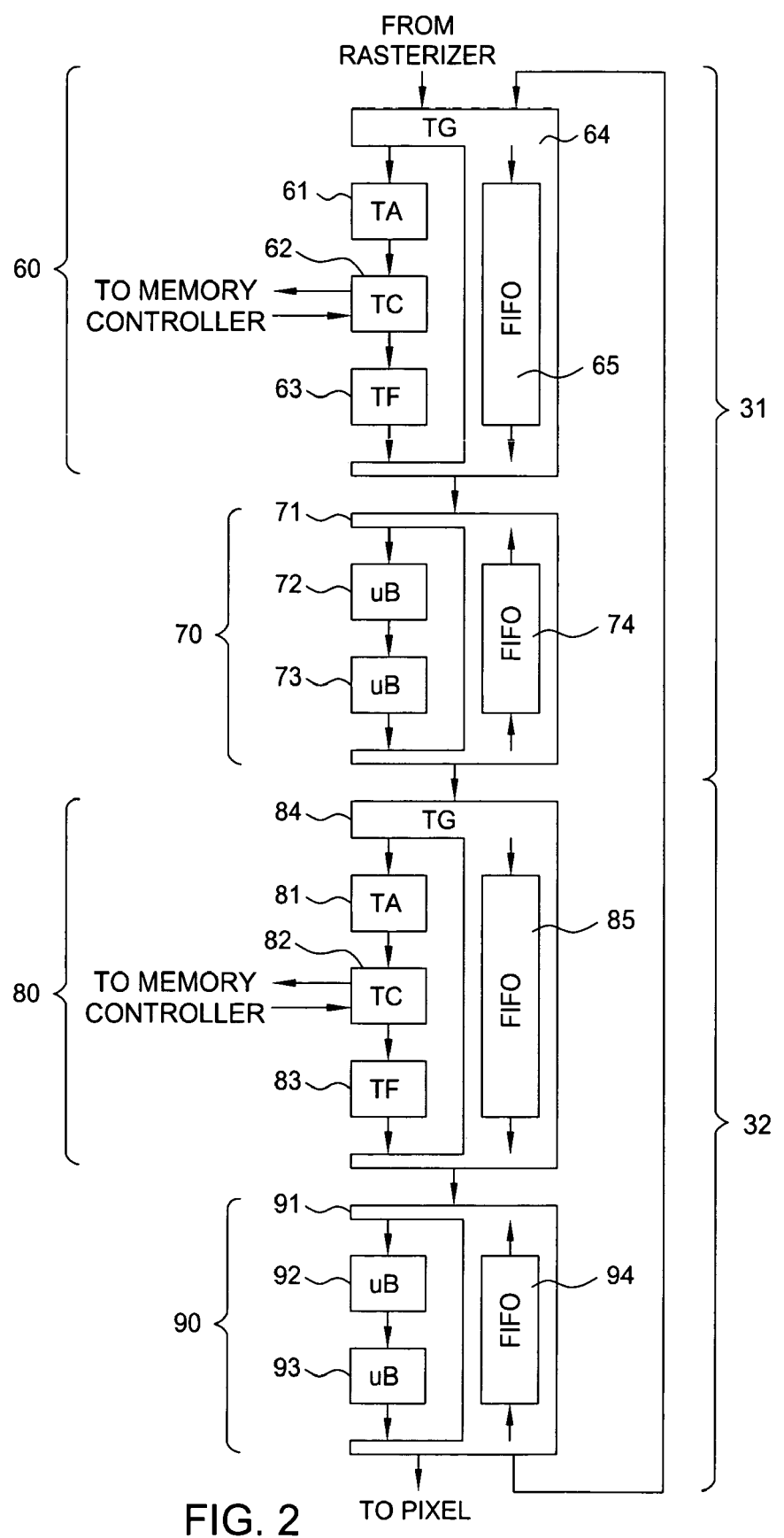
FIG. 2 is a block diagram of an embodiment of pixel shader 30 of FIG. 1.

With reference to FIG. 3, we next describe the format of a typical data packet asserted from rasterizer 20 to pixel shader 30, from pixel shader 30 to processor 40, or within pixel shader 30 from processor 64 to unit 71, unit 71 to processor 84, processor 84 to unit 91, or unit 91 back to processor 64, in a typical implementation of the FIG. 1 system (with pixel shader 30 implemented as in FIG. 2). The packet comprises four of the 192-bit×4-element data structures shown in FIG. 3 transmitted in parallel (e.g., one for each pixel in a 2×2 square of pixels in screen space called a "quad"), and a 5-bit instruction pointer "IP" and a 16-bit coverage value "Covg" transmitted in parallel with the 192-bit×4-element structures. Each 192-bit×4-element structure is transmitted in four clock cycles as follows: data values T0, T1, and C0/1 are transmitted (with instruction pointer "IP" and coverage value "Covg") in cycle N (where N is an arbitrary integer), data values T2, T3, and C2/3 are transmitted in cycle N+1, data values T4, T5, and C4/5 are transmitted in cycle N+2, and data values T6, T7, and C6/7 are transmitted in cycle N+3. Each of values T0, T1, C0/1, T2, T3, C2/3, T4, T5, C4/5, T6, T7, and C6/7 comprises 64 bits that are transmitted in parallel (in a single clock cycle). Thus, a 789-bit (or 768-bit) subset of the packet is transmitted during each clock cycle.

Each of the data values T0, T1, C0/1, T2, T3, C2/3, T4, T5, C4/5, T6, T7, C6/7 can have any functionality (i.e., each can be indicative of any specific kind of data, address, or instruction). Neither the design nor the structure of any component of the FIG. 2 embodiment depends on the specific functionality assigned to the data values. In a typical implementation, T0, T1, T2, T3, T4, T5, T6, and T7 are texture coordinate data values. Similarly, C0/1, C2/3, C4/5, and C6/7 are typically color data values (e.g., red, green, blue, and alpha values). In some implementations, each of the values C0/1, C2/3, C4/5, and C6/7 is a pair of 32-bit words of RGBA video data (each 32-bit word is a color value for a different pixel), and each of the values T0, T1, T2, T3, T4, T5, T6, and T7 is a 64-bit texture coordinate ("ST" or "STR," as indicated in FIG. 3) or a texel (or pair of 32-bit texels) determined by the texture coordinate. In other implementations, each of the values C0/1, C2/3, C4/5, and C6/7 is a 64-bit word of RGBA video data (a 64-bit red, green, blue, or alpha value for a color pixel), and each of the values T0, T1, T2, T3, T4, T5, T6, and T7 is a 64-bit texture coordinate (having "ST" or "STR" format, as indicated in FIG. 3) or a texel determined by the texture coordinate. In some implementations, each value C0/1 is a 64-bit color value of a pixel (a "first pixel"), each of values C2/3, C4/5, and C6/7 is another 64-bit color value (in some cases these color values are to be blended or otherwise combined with the first pixel, or they are partially processed values generated by combining the first pixel with at least one other value), and values T0, T1, T2, T3, T4, T5, T6, and T7 are texels to be combined with each other and/or with one or more of the color values C0/1, C2/3, C4/5, and C6/7 (or they are texture coordinates for use in retrieving such texels). It should also be recognized that the identifiers T0, T1, T2, T3, T4, T5, T6, and T7, and C0/1, C2/3, C4/5, and C6/7 are meant as an aid to identifying the type of data typically stored in each 64 bit field, but in no way limit the data which can be stored in a particular field. Thus, a typical implementation would allow for ST, STR, 32-bit RGBA data, or 64-bit RGBA data to be stored in any field regardless of the label which is assigned to the field. In such an implementation, the instruction referenced by the instruction pointer could be used to identify the data which has been stored in a particular field.

Alternatively, the position of a field within the packet could be used to identify the type of data stored within the field.

A value having "ST" format (as indicated in FIG. 3) is a texture coordinate having the conventional "ST" format often used to specify the address of a texel of a two-dimensional texture map. A value having "STR" format (as indicated in FIG. 3) is a texture coordinate having the conventional "STR" format often used to specify the address of a texel of a three-dimensional texture map.

When a particular field is used to store color data, the 8-bit or 16-bit red, green, blue and alpha values which comprise the color data can be denoted by the monikers R, G, B, and A. For example, if C0/1 contains a single 64 color value, then the red, green, blue, and alpha data within C0/1 can be referred to as $C0/1_R$, $C0/1_G$, $C0/1_B$, and $C0/1_A$. If C0/1 contains two 32 bit color values, then the components of these values can be referred to as $C0_R$, $C0_G$, $C0_B$, and $C0_A$ for the red, green, blue, and alpha value for one color, and $C1_R$, $C1_G$, $C1_B$, and $C1_A$ for the red, green, blue, and alpha values for the second color. Similarly, if T0 is used to store two dimensional texture coordinates (ST data), the individual coordinates can be referred to as $T0_S$ and $T0_T$. As a final example, if T2 is used to store a 64 bit color value, the color components with the color value would be referred to as $T2_R$, $T2_G$, $T2_B$, and $T2_A$ for red, green, blue, and alpha; likewise two dimensional texture coordinates stored within field C4/5 could be referred to as $C4/5_S$ and $C4/5_T$.

In a typical implementation, as a packet is processed within the pixel shader 30, the data values contained within each field can vary according to the particular part of the program being executed. For example, when a packet is created, field T0 of the packet can be a texture coordinate. As processing of the pixel shader program proceeds, T0 can be color data. Later in the same program, execution of the program may cause field T0 again to be a texture coordinate. In one implementation, each instruction can determine how the fields T0, T1, T2, T3, T4, T5, T6, T7, C0/1, C2/3, C4/5, and C6/7 will be interpreted with regards to the type of data determined by each field at any given level of processing. In another implementation, the packets transmitted between processing elements do not include fields that are not to be immediately used (to allow packets containing less data to be transmitted in less time). For example, a packet including N fields can be transmitted to a first processing stage, an updated version of the packet comprising N−1 fields can be transmitted by the first processing stage to a second processing stage, and a further updated version of the packet comprising N+1 fields can be transmitted by the second processing stage to a third processing stage. Yet another implementation may constrain each field to only hold one type of data and may require that all fields (even unused fields) are transmitted between processing elements (so that each updated version of a packet that is transmitted always has the same number of fields as the previous version of the packet).

All (or substantially all) information about the current level of processing for a pixel (e.g., an RGBA pixel whose components prior to processing in pixel shader 30 had the values $C0/1_R$, $C0/1_G$, $C0/1_B$, and $C0/1_A$) is keyed off the current value of the instruction pointer "IP," since the current value of IP in a packet (sometimes together with one or more condition codes in the packet, where each condition code is typically generated during execution of a prior instruction) determines the next instruction to be executed on the data contained in the packet. After the pixel shader executes the operation determined by the current value of IP, it updates the value of IP. Since the updated IP in each packet points to the next instruction to be executed on data in the packet, any processing unit of the pixel shader can change the instruction that will be executed by a subsequent processing unit by modifying the instruction pointer (and/or condition codes) of a packet that it asserts to the subsequent processing unit. Thus, the inventive pixel shader can implement jumping, branching, conditional jumping and branching, looping, and other high-level flow control constructs.

The coverage value "Covg" of a packet having the FIG. 3 format indicates the extent to which the data values of a sequence of the packets are valid data. For example, consider a sequence of packets asserted to the input of the inventive pixel shader that determine the pixels of one triangular primitive.

Each packet in the sequence comprises four of the 192-bit×4-element data structures of FIG. 3 containing pixel data for a 2×2 region of screen space, as well as a 5-bit IP value and a 16-bit Covg value as shown in FIG. 3. The primitive can be thought of as being "covered" by a grid of the packets. Each packet of the grid that is "full" of data (and "covers" a "central" pixel at or near the center of the triangular primitive) includes valid data for processing the central pixel (e.g., data indicative of the central pixel itself, and texels for the central pixel and three other pixels of the primitive surrounding the central pixel), and can include a "Covg" value of equal to "1111111111111111." Each packet of the grid that is nearly "empty" of data since it includes valid data for processing only an "edge" pixel at or near the edge of a triangular primitive (e.g., data indicative of the edge pixel itself, and texels for the edge pixel and not more than one pixel of the primitive adjacent to the edge pixel), can include a different value of "Covg" indicative of this packet's degree of coverage of the primitive.

The inventors contemplate many variations on the packet format described with reference to FIG. 3. For example, some packets for processing in accordance with the invention have width different from the packet width mentioned above with reference to FIG. 3. For another example, some packets for processing in accordance with the invention can be transmitted in a single clock cycle, others require two or three clock cycles to transmit them, and others require more than four clock cycles to transmit them. In some implementations, packets may vary in length as the processing occurs so that the packet is small when little storage is required (such as near the completion of the program when only a single color value is produced) or larger when more storage is required (such as in the middle of the execution of a program, where many temporary values are required). The length of a packet can be controlled via parameters within the packet itself allowing the program to directly control the length of the packet throughout the execution of a program. Alternately, the length can be controlled by hardware which examines the resources required by a program at the beginning of execution and/or during program execution.

A preferred embodiment of pixel shader 30 will be described with reference to FIG. 2. The FIG. 2 embodiment of pixel shader 30 comprises two identical pipelined processing stages: upstream stage 31 (including texture subsystem 60 and processor 70) and downstream stage 32 (including texture subsystem 80 and processor 90). Texture subsystem 60 is identical to texture subsystem 80, and processor 70 is identical to processor 90. Texture subsystem 60 of FIG. 2 corresponds to texture subsystem 30A of FIG. 1, and texture subsystem 70 of FIG. 2 corresponds to a second texture subsystem (not shown in FIG. 1) of pixel shader 30.

Texture subsystem 60 comprises processor 64, texture addressing stage 61 (coupled to receive texture coordinates extracted by processor 64 from the packets received from rasterizer 20), texture cache stage 62 (having an input coupled to the output of stage 61, and an output), and texture filtering stage 63 (having an input coupled to the output of stage 62 and an output coupled to processor 64). Processor 64 includes shift register 65 (sometimes referred to as FIFO 65).

Processor 64 processes each packet asserted at the output of rasterizer 20, except when the overall system is stalled (such as when processor 64 receives and processes a recirculated packet from the output of processor 90, or when some other element of pixel shader 30 receives and processes a recirculated packet from another element of pixel shader 30). For each packet accepted and processed by processor 64, processor 64 extracts one or more texture coordinates from the packet, sends each texture coordinate to texture addressing stage 61, and shifts the packet into shift register 65. Stage 61 generates all the addresses determined by the texture coordinates, and asserts these addresses to texture cache stage 62. Stage 62 retrieves all the texels determined by the addresses received from stage 61. Stage 62 includes a cache memory, and is configured to retrieve from the cache memory those texels (determined by the addresses received from stage 61) that are present in the cache memory and to perform all necessary accesses of texture memory 25 shown in FIG. 1 (or another texture memory) to retrieve those texels (determined by the addresses received from stage 61) that are not cached in the cache memory. Stage 62 asserts all retrieved texels to texture filtering stage 63.

Stage 63 performs any necessary filtering operations on the texels received from stage 62, and asserts the resulting filtered texels to processor 64.

In some implementations, stage 63 is preconfigured to perform specific filtering operations (before assertion of any packet to processor 64). In other implementations, stage 63 can be controlled by processor 64 to perform specific filtering operations in response to one or more instructions determined by packets being processed by pixel shader 30. While stages 61, 62, and 63 perform the operations necessary to generate filtered texels for a packet, the corresponding packet is shifted through register 65 with appropriate timing. Processor 64 generates updated packets by inserting each filtered texel output from stage 63 into the packet being shifted out from register 65, typically in place of one or more texture coordinates originally included in the packet. For example, when a packet (received by unit 60 from rasterizer 20 and then shifted through register 65) includes a texture coordinate that has been employed by unit 60 to generate a filtered texel, an updated packet can be generated by omitting the texture coordinate from the packet and including in its place the filtered texel.

Processor 64 asserts each updated packet to gatekeeping and recirculating unit 71 of processor 70. Unit 71 includes shift register 74 (sometimes referred to as FIFO 74). In response to each updated packet from processor 64, unit 71 either refuses to accept the packet (causing operation of the system to stall, e.g., while microblenders 72 and 73 process a recirculated packet that has been shifted through FIFO 74) or unit 71 accepts the packet and asserts it to microblender 72. Microblender 72 identifies at least one instruction for processing data within each packet that it receives (by retrieving or generating each instruction in response to contents of the packet), executes each instruction to generate an updated version of the packet, and asserts the updated version of each packet to microblender 73. Typically, microblender 72 includes a local memory into which instructions are pre-loaded (e.g., during initialization of pixel shader 30) and microblender 72 retrieves a single instruction, including an operation code ("Opcode") and a data value (a "constant"), from the local memory in response to each instruction pointer.

Typically, a program comprising instructions for processing the pixels and texels included in the packets is stored in a frame buffer (e.g., frame buffer 50), and all or some of the instructions of the program are pre-loaded into local memory in each of units 70 and 90 (or each of units 60, 70, 80, and 90) such as during initialization of pixel shader 30. Each IP (instruction pointer) in a packet points to one of the instructions that has been pre-loaded into the local memory.

Thus, in some implementations, microblender 72 responds to a packet's IP by retrieving a corresponding instruction from local memory (e.g., elements 125 and 126 of the FIG. 5 embodiment of microblender 72, or another memory elsewhere within unit 70) and executing the instruction. The instruction can be a conditional instruction, and such a conditional instruction can depend on a data value included in the packet being processed. For example, the IP in a packet can point to a conditional instruction, and the conditional instruction can in turn point to some value included in the packet (e.g., the conditional instruction can require that microblender 72 perform some operation on the packet's "C0/1" value, shown in FIG. 3, in a manner determined by the packet's "T2" value, also shown in FIG. 3).

Microblender 73 also identifies at least one instruction for processing data within each packet it receives from microblender 73, executes each such instruction to generate a further updated version of the packet, and asserts the further updated version of each packet to unit 71. In response to each packet received from microblender 73, unit 71 either asserts the packet to processor 84 of texture subsystem 80, or recirculates the packet (for further processing during an additional pass through microblenders 72 and 73) by shifting the packet into shift register 74 (note the direction of the arrows on shift register 74). Typically, microblender 73 generates a control word in response to the current instruction (the instruction being executed by microblender 73). This control word determines whether unit 71 sends the updated packet (asserted at the output of microblender 73) to unit 80 or recirculates the packet back to microblender 72, and microblender 73 asserts the control word (with the updated packet) to unit 71 to cause unit 71 to route the updated packet appropriately. Unit 71 shifts each updated packet to be recirculated through microblenders 72 and 73 into register 74, and each such packet is shifted through register 74 until it is asserted out of register 74 (with appropriate timing) to the input of microblender 72. When a recirculated packet is shifted out of register 74, unit 71 stalls the transfer from texture subsystem 60 to microblender 72 of one or more subsequent packets while microblender 72 and then microblender 73 process each recirculated packet.

Consider for example, the execution of a program that requires the averaging of multiple texels of a packet, followed by blending of the resulting averaged texel with a color value (e.g., color value C0/1 of the FIG. 3 packet) in the case that each of microblenders 72 and 73 is capable of performing only one multiplication (or addition) operation per clock cycle. Processor 70 would execute some of the operations required for computing the required average in a first pass through microblender 72 (which would require four clock cycles if the packet's length is four cycles, as is the length of the packet of FIG. 3). Then, other ones of the averaging operations would be executed in a first pass through microblender 73 (which would also require four clock cycles in the case that the packet's length is four cycles). Then, unit 71 would shift the partially processed packet through register 74 back to the input of microblender 72. Additional ones of the averaging operations would then be executed in a second pass through microblender 72, and additional ones of the averaging operations would then be executed in a second pass through microblender 73. Then, unit 71 would again shift the resulting packet through register 74 back to the input of microblender 72. Additional ones of the averaging operations would then be executed in a third pass through microblender 72 to generate the required averaged texel, and the updated packet (with the averaged texel) would pass to microblender 73. Blending of the averaged texel with the relevant color value (e.g., color value C0/1) would then be executed in a third pass through microblender 73 to generate the fully processed packet.

Texture subsystem 80 comprises processor 84, texture addressing unit 81, texture cache unit 82, and texture filtering unit 83, which are identical respectively to processor 64, texture addressing unit 61, texture cache 62, and texel filtering unit 63 of texture subsystem 60. Processor 84 includes shift register 85 which is identical to shift register 65 of processor 64.

Processor 84 accepts and processes each packet asserted at the output of processor 70, except when the overall system is stalled. When processing each accepted packet, processor 84 extracts one or more texture coordinates from the packet, sends each texture coordinate to texture addressing unit 81, and shifts the packet into shift register 85. Unit 81 generates all the addresses determined by the texture coordinates, and asserts these addresses to texture cache unit 82.

Unit 82 retrieves all the texels determined by the addresses received from unit 81. Unit 82 includes a cache memory, and is configured to retrieve from the cache memory those texels (determined by the addresses received from unit 81) that are present in the cache memory and to perform all necessary accesses of texture memory 25 shown in FIG. 1 (or another texture memory) to retrieve those texels (determined by the addresses received from unit 81) that are not cached in the cache memory. Unit 82 asserts all retrieved texels to texture filtering unit 83.

Unit 83 performs any necessary filtering operations on the texels received from unit 82, and asserts the resulting filtered texels to processor 84. In some implementations, unit 83 is preconfigured to perform specific filtering operations (before assertion of any packet to processor 84). In other implementations, unit 83 can be controlled by processor 84 to perform specific filtering operations in response to one or more instructions determined by packets being processed by pixel shader 30. While units 81, 82, and 83 perform the operations necessary to generate filtered texels for a packet, the corresponding packet is shifted through register 85 with appropriate timing. Processor 84 generates updated packets by inserting each filtered texel output from unit 83 into the packet being shifted out from register 85, typically in place of one or more texture coordinates originally included in the packet. Processor 84 asserts each updated packet to gatekeeping and recirculating unit 91 of processor 90.

Unit 91, microblenders 92 and 93, and shift register 94 of processor 90 are identical, respectively, to unit 71, microblenders 72 and 73, and shift register 74 of processor 70. In response to each updated packet from processor 84, unit 91 either refuses to accept the packet (causing operation of the system to stall, e.g., while microblenders 92 and 93 process a recirculated packet that has been shifted through register 94) or unit 91 accepts the packet and asserts it to microblender 92. Microblender 92 identifies at least one instruction for processing data within each packet that it receives (by retrieving or generating the instructions in response to contents of the packet), executes each instruction to generate an updated version of the packet, and asserts the updated version of each packet to microblender 93. Typically, each of microblenders 92 and 93 includes a local memory (into which instructions have been pre-loaded, e.g. during initialization of pixel shader 30), and each microblender retrieves a single instruction, including an operation code ("Opcode") and a data value (a "constant"), from the local memory in response to each instruction pointer.

Microblender 93 identifies at least one additional instruction for processing data of each packet that it receives from microblender 92, executes each such instruction to generate a further updated version of the packet, and asserts the further updated version of each packet to unit 91. In response to each packet received from microblender 93, unit 91 either asserts the packet to pixel processor 40 (or directly to frame buffer 50 in implementations in which processor 40 is not included), or recirculates the packet through shift register 94 (for additional processing in another pass through microblenders 92 and 93), or recirculates the packet to an input of processor 64 (for further processing during another pass through the entire pixel shader). Unit 91 can shift each packet asserted at the output of microblender 93 through register 94, and out of register 94 with appropriate timing to the input of microblender 92, while stalling the transfer to microblender 92 of one or more subsequent packets from texture subsystem 80 while microblender 92 and then microblender 93 process each recirculated packet that has been shifted out of register 94. Typically, microblender 93 generates a control word in response to the current instruction (the instruction being executed by microblender 93), this control word determines whether unit 91 sends the updated packet (being asserted at the output of microblender 93) to unit 40 (or frame buffer 50) or recirculates the packet back to microblender 92 (or texture subsystem 60), and microblender 93 asserts the control word (with the updated packet) to unit 91 to cause unit 91 to route the updated packet appropriately.

Typically, each of units 62 and 82 can perform one bilinear texture lookup per clock cycle.

Figure 4:
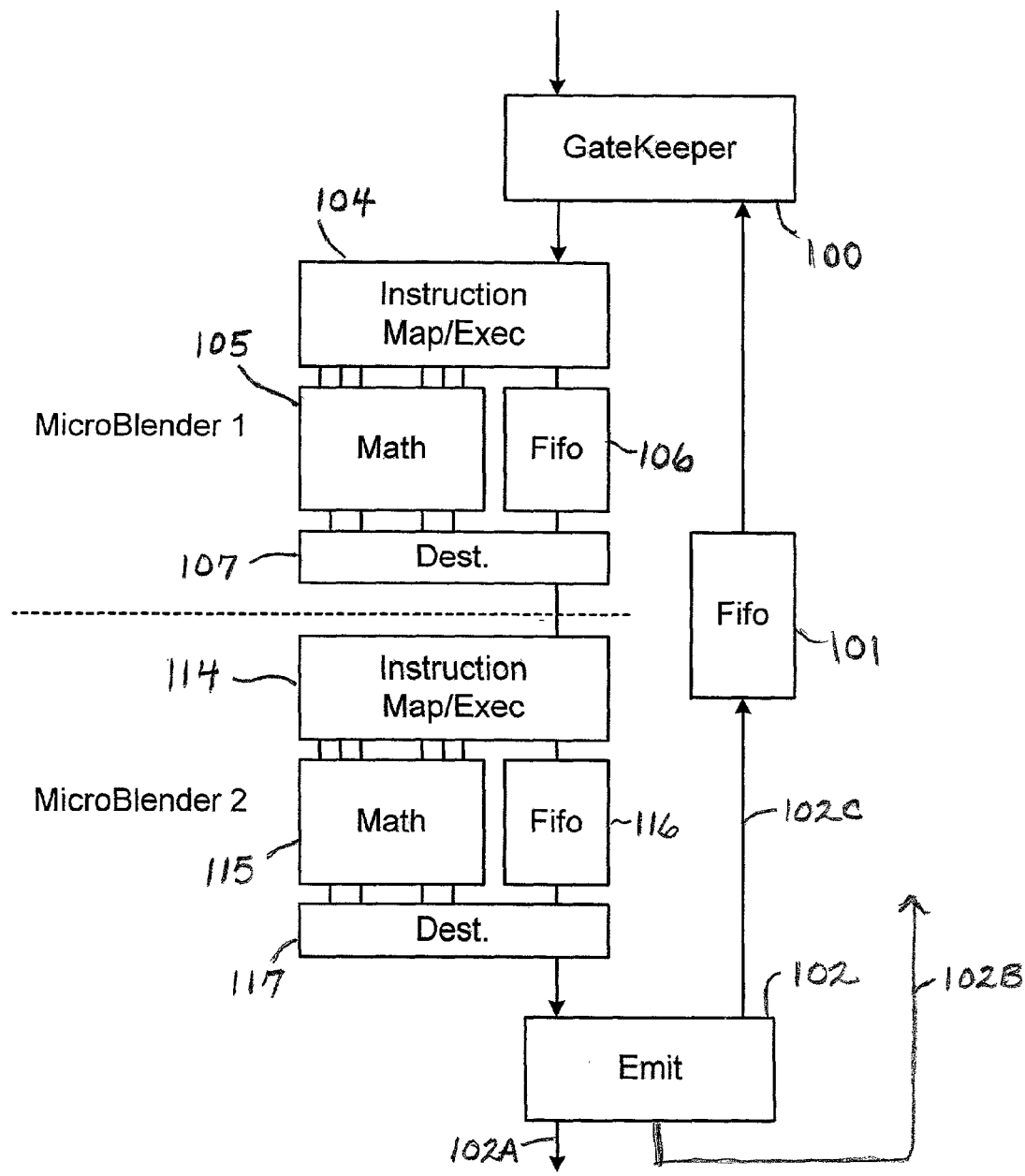
FIG. 4 is a block diagram of one embodiment of processor 70 (or 90) of FIG. 2.

FIG. 4 is a simplified block diagram of an embodiment of processor 70 (or 90) of FIG. 2. Gatekeeper unit 100, FIFO 101, and emitter unit 102 (connected as shown) of FIG. 4 implement unit 71 of FIG. 2. The FIG. 4 processor also includes a first microblender (an implementation of microblender 72 or 92 of FIG. 2) comprising instruction mapping and execution unit 104, math unit 105, FIFO 106, and destination unit 107 (connected as shown), and a second microblender (an implementation of microblender 73 or 93 of FIG. 2) comprising instruction mapping and execution unit 114, math unit 115, FIFO 116, and destination unit 117 (connected as shown). Unit 114 is identical to unit 104, unit 115 is identical to 105, FIFO 116 is identical to FIFO 106, and unit 117 is identical to 107.

Figure 5:
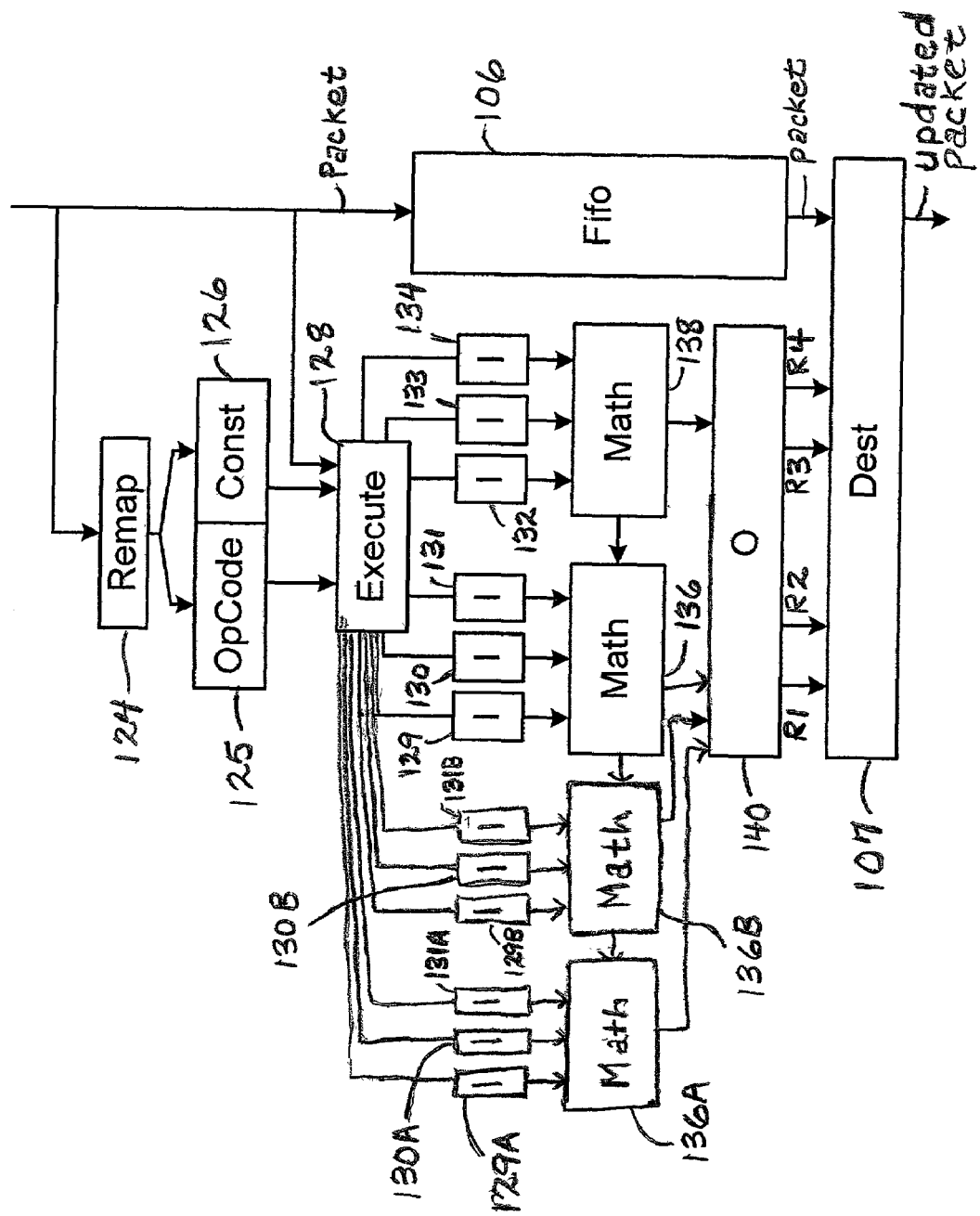
FIG. 5 is a block diagram of one embodiment of a microblender (e.g., unit 72, 73, 92, or 93) of FIG. 2.

FIG. 5 is a block diagram of a fully pipelined, fixed latency microblender (having five stages) suitable for implementing each of the microblenders of FIG. 2 or FIG. 4. FIFO 106 and destination unit 107 of the FIG. 5 microblender are identical to the identically labeled units of FIG. 4. In FIG. 5, local memories 125 and 126 function as look-up tables into which program data are pre-loaded to enable the microblender to execute program instructions. Specifically, local memory 125 stores an Opcode value (typically a 128-bit word), and local memory 126 stores a constant value (typically a 64-bit word), for each instruction. In a typical implementation, eight 128-bit Opcode values are stored in memory 125 and eight 64-bit constant values (one for each Opcode) are stored in memory 126. These eight opcodes can represent all or part of a program.

To reduce the size of the instruction set that is stored in local memory within the microblender, multiple instructions in the program are all mapped to a single Opcode/constant pair. In an embodiment in which each instruction pointer (IP) of a packet is a 5-bit value (as in the packet of FIG. 3), remap unit 124 implements a look-up table that asserts to each of local memory 125 and local memory 126 a different 3-bit address in response to each different IP value. In operation, each incoming packet is asserted to remap unit 124, to execution unit 128, and to FIFO 106. Remap unit 124 responds to the IP of the current packet by asserting a 3-bit address to each of memory 125 and memory 126. In response, memory 125 asserts an Opcode to execution unit 128, and memory 126 asserts a constant to execution unit 128. A new packet can be asserted to the microblender each clock cycle, and units 124, 125, and 126 are configured to be capable of asserting an updated Opcode/constant pair once per clock cycle. Alternatively, a new packet may require multiple clock cycles to transmit, and the microblender may execute a new instruction on each clock cycle using the data which is available within the packet on the associated cycle, or data which was available on a previous clock cycle for the packet.

The microblender of FIG. 5 typically includes four math units (each with a corresponding set of input processors): math unit 138, math unit 136, and two math units (136A and 136B) identical to unit 136 (each connected serially so that an output of math unit 138 is available for math unit 136, an output of math unit 136 is available to math unit 136B, and an output of math unit 136B is available to math unit 136A, each math unit connected between units 128 and 140). When each packet includes data for a red, green, blue, and alpha pixel (a red, green, blue, and alpha component of a color pixel) as does the packet described with reference to FIG. 3, math unit 138 typically performs an operation on the alpha pixel (or data related to the alpha pixel), math unit 136A typically performs an operation on the red pixel (or data for texturing the red pixel), the third math unit 136B typically performs an operation on the green pixel (or data for texturing the green pixel), and the fourth math unit 136 typically performs an operation on the blue pixel (or data for texturing the blue pixel).

In the FIG. 5 implementation, execution unit 128 extracts up to three, 64-bit input arguments from an input packet, and divides each argument into up to four components. Each component of each argument is asserted to an input processor. For example, for a particular command, the three input arguments T0, T1, and C0/1 may be extracted from the input packet. In this example, assume that each of these arguments contains red, green, blue, and alpha color data. For this example, the execution unit provides T0$_R$, T1$_R$, and C0/1$_R$ to input processors 129A, 130A, and 131A, respectively, T0$_G$, T1$_G$, and C0/1$_G$ to input processors 129B, 130B, and 131B, respectively, T0$_B$, T1$_B$, and C0/1$_B$ to input processors 129, 130, and 131, respectively, and T0$_A$, T0$_A$, and C0/1$_A$ to input processors 132, 133, and 134 respectively. As another example, for a particular command, the two input arguments T2 and T3 may be extracted from the input packet. In this example, assume that each of these arguments contains three texture coordinates S, T, and R. For this example, the execution unit provides T2S and T3S to input processors 129A and 130A, respectively, T2T and T3T to input processors 129B and 130B, respectively, and T2R and T3R to input processors 129, and 130, respectively. In this example, math unit 138 and associated input processors 132, 133, and 134 could be used to process another command. Finally, if a particular command specifies a constant input as an argument, the execution unit asserts the value provided by constant memory 126 for this argument.

In one contemplated implementation, execution unit 128 processes up to two independent Opcodes in parallel utilizing math units 136A, 136B, and 136 to process Opcodes for two or three component input arguments, and utilizing math unit 138 to process one component input arguments. In this implementation, math units 136A, 136B, and 136 can be used to process an Opcode referring to only the red, green, and blue components of a pixel color, and math unit 138 maybe used to process a different Opcode referring to only the alpha component of a pixel color. This implementation could also allow all four math units 136A, 136B, 136 and 138 to process a single Opcode referring to all four color components of a pixel (e.g. red, green, blue and alpha components).

Each of input processors 132, 133, and 134 performs an input operation (determined by the control Opcode) on one of the arguments entering the alpha channel, each of input processors 129, 130, and 131 performs an input operation (determined by the Opcode) on one of the arguments entering the blue channel, each of input processors 129A, 130A, and 131A performs an input operation (determined by the Opcode) on one of the arguments entering the green channel, and each of input processors 129B, 130B, and 131B performs an input operation (determined by the Opcode) on one of the arguments entering the red channel.

The input processors are typically implemented to perform any of a variety of input operations, such as format conversion, input swizzle, scaling and biasing, and inversion. For example, in one implementation each of processors 129, 130, and 131 is coupled to route the argument (A1, A2, or A3) received at its input to any of the three inputs of math unit 138, and processors 129, 130, and 131 are configured to implement an input swizzle operation to duplicate and/or reorder the arguments of an ordered set of arguments (A1, A2, and A3) received from unit 128, e.g., by replacing this ordered set with a reordered set (A2, A1, A3), a modified set (A3, A2, A3), or some other reordered or modified set.

For another example, each of processors 129, 130, and 131 is configured to perform format conversion (in response to control bits generated by unit 128 in response to a specific Opcode) on an argument received from unit 128. For example, where the argument is a 64-bit value having conventional "ST" format from location T0 of the packet, format conversion is performed on this argument to replace it with a 64-bit value having a conventional "RGBA" format.

Execution unit 128 also generates control bits (for processing in each of the alpha, red, green, and blue processing channels and in destination unit 107) in response to the Opcode, and asserts these control bits to the input processing circuitry. Some of the control bits are employed by the input processing circuitry, and others are passed through the input processing circuitry to appropriate ones of the math units, output processing circuitry 140 (to be described below), and destination unit 107. Unit 107 generates an updated IP in response to a subset of the control bits and replaces the IP of the current packet with the updated IP. Alternatively, execution unit 128 generates the updated instruction pointer IP, the updated IP is routed to destination unit 107, and unit 107 substitutes it for the IP of the current packet.

In a preferred implementation, each of math units 136, 136A, 136B, and 138 receives three arguments (to be denoted as ARG0, ARG1, and ARG2, respectively) that have undergone processing in the input processing circuitry, and control bits MULT, LERP, and ADD that have been generated in execution unit 128 and passed through the input processing circuitry. In some implementations, unit 128 generates control bits for each channel independently, so that the MULT, LERP, and ADD bits for one channel do not necessarily match those of another channel. T0 cause a math unit to multiply ARG1 with ARG2, and assert as a result a value ARG1*ARG2 at its output, the codes for the math unit are MULT=1, LERP=0, and ADD=0. To cause the math unit to add ARG0 with ARG1, and assert as a result a value ARG0+ARG1 at its output, the codes for the math unit are MULT=0, LERP=0, and ADD=1. To cause a math unit to perform a linear interpolation operation on AR0, ARG1, and ARG2, and assert as a result a value ARG0*(1−ARG2)+ ((ARG1)*(ARG2)) at its output, the codes for the math unit are MULT=0, LERP=1, and ADD=0.

Thus, each of the math units is configured to perform the following operation on the three arguments at its inputs:

$$R=(\text{MULT} ? 0.0 : ARG0)+(ARG1-(\text{LERP} ? ARG0:0.0)) \\ *(\text{ADD} ? 1.0 : ARG2),$$

where the notation "TERM=X? Y.0:Z" denotes that if X=1, then TERM=Y, and if X=0, then TERM=Z.

In some implementations, the math units are configured to implement 3-component vector dot products (known as "DP3" operations) and 4-component vector dot products (known as "DP4" operations) efficiently. For example, the math units are configured to respond to control bits indicative of a DP3 operation by executing a 3-component vector dot product on six arguments received from the input processing circuitry, and the math units are configured to respond to control bits indicative of a DP4 operation by executing a 4-component vector dot product on eight arguments received from the input processing circuitry. In executing a vector dot product, it may be efficient for each of the math units to provide results to another math unit. Thus, FIG. 5 shows that math unit 138 is coupled to assert an argument to unit 136, unit 136 is coupled to assert an argument to unit 136B, and unit 136B is coupled to assert an argument to unit 136A, and it is contemplated that each of at least some of the math units can perform mathematical operations on a set of more than three arguments input thereto.

Such dot-product operations are useful to implement some types of bump mapping. More generally, the microblender of FIG. 5 can be implemented to be capable of executing the mathematical operations required for efficient bump mapping and multi-texturing.

The data value "R" output from unit 136A is identified in FIG. 5 as "R1," the data value R output from unit 136B is identified in FIG. 5 as "R2," the data value R output from unit 136 is identified in FIG. 5 as "R3," and the data value R output from unit 138 is identified in FIG. 5 as "R4."

Output processor 140, connected between math units 136, 136A, 136B, and 138 and destination unit 107, is configured to perform output processing on the data values (R1, R2, R3, and R4) that it receives from the math units. Output processor 140 is typically implemented to perform any of a variety of output operations, such as output swizzle, per channel logic operations, scaling, clamping, and format conversion. For example, processor 140 can be configured to perform an output swizzle operation to duplicate and/or reorder the ordered set of data values (R1, R2, R3, and R4) received from the math units, e.g., to replace it with a reordered set (R2, R1, R3, R4), a modified set (R3, R2, R3, R4), or some other reordered or modified version of the ordered set asserted thereto. For another example, processor 140 can be configured to perform format conversion (in response to one or more control bits generated by execution unit 128 in response to a specific Opcode) on any of the values received from the math units. For example, where the value R1 is a 16-bit color value to replace the current value in location $C0/1_G$ of the packet, format conversion is performed on R1 to replace it with an 8-bit color value R1' to replace the current value in location $C0_G$ of the packet.

In alternative embodiments, units 132, 133, 134, 129, 130, 131, 129A, 130A, 131A, 129B, 130B, and 131B are omitted (replaced by short circuits), or processor 140 is omitted (so that the output of math units 136, 136A, 136B, and 138 are data values R1, R2, R3, and R4, respectively), or units 132, 133, 134, 129, 130, 131, 129A, 130A, 131A, 129B, 130B, and 131B are omitted (replaced by short circuits) and processor 140 is omitted.

Destination unit 107 of FIG. 5 corresponds to unit 107 (or 117) of FIG. 4. With reference to FIG. 5, while unit 128 selects arguments and the arguments are processed in the input processing circuitry 129–134, 129A–131A, and 129B–131B, math units 136, 136A, 136B, and 138, and output processor 140, the current packet is shifted through FIFO 106 to destination unit 107. The packet is updated when it is shifted out of FIFO 106. Specifically, destination unit 107 responds to control bits (generated in execution unit 128 in response to the current Opcode, and routed to unit 107) by replacing appropriate values of the packet emerging from FIFO 106 with corresponding values received from output processor 140. As noted above, unit 107 also replaces the packet's current IP with an updated IP. As also noted above, one or more of the values inserted into the packet by unit 107 can function as condition codes for use by one or more processing units of pixel shader as predicates for subsequent instructions.

Destination unit 107 asserts each updated packet to a downstream unit. The downstream unit can be either the emitter unit 102 of FIG. 4 (in case unit 107 is included in microblender 73 or 93 or another final microblender in a microblender sequence in a processor of the inventive pixel shader) or a downstream microblender (in case unit 107 is included in microblender 72 or 92 or another microblender that is not the final microblender in a microblender sequence in a processor of the inventive pixel shader).

Emitter unit 102 of FIG. 4 is configured to route each updated packet that it receives to output 102A (which can be coupled to a downstream stage, such as pixel processor 30 or frame buffer 50 of FIG. 2 in case emitter unit 102 is within processor 90, or processor 84 of FIG. 2 in case emitter unit 102 is within processor 70), or to output 102B (which can be coupled to an input of an upstream stage, such as texture subsystem 60 of FIG. 2), or to output 102C (which is coupled to the input of FIFO 101). Control bits generated in execution unit 128 in response to the current Opcode, and routed to unit 102, determine how unit 102 routes each updated packet that it receives. For example, unit 102 can include logic that responds to a control bit that mandates additional processing in a texture subsystem by routing a packet to output 102B rather than to 102A if the state of the logic indicates that no texture subsystem is coupled to output 102A downstream from unit 102, and by routing the packet to output 102A if the state of the logic indicates that a texture subsystem is coupled to output 102A downstream from unit 102.

Typical implementations of the inventive pixel shader can execute jump, branch, and conditional instructions. For example, if the current value of IP points to instruction $I_n$ and the program is a sequence of consecutive instructions without branch instructions (or other conditional instructions), a microblender merely substitutes a pointer to the next instruction $I_{n+1}$ in place of the current value of IP. If the program includes a branch (or other conditional) instruction that specifies one of two or more possible instructions as the "next" instruction depending on the value of one or more condition codes, the microblender (e.g., unit 117 of the microblender of FIG. 5) can select one of the possible instructions (i.e., determine which of the possible instructions the next value of IP should point to) if the condition codes are included in or determined by the packet being processed. For example, a condition code could be the value occupying a specific bit location of the packet (e.g., a "red" texel value occupying location $T6_R$ of a packet having the FIG. 3 format).

Consider one example of execution of a conditional instruction to process a packet containing at least one data structure that functions as a condition code. If the packet has the format described above with reference to FIG. 3, the pixel shader performs four texturing operations in parallel on four pixels determined by each packet (each pixel being determined by a different one of the packet's four, 192-bit×4-element structures), and the packet points to a conditional instruction, the first and fourth pixels can be operated on by a different instruction than are the second and third pixels during the same clock cycle. This is because the condition code in each of the first and fourth 192-bit×4-element structures of the packet can have a first value, and the condition code in each of the second and third 192-bit×4-element structures of the packet can have a second value different than the first value.

In variations on the FIG. 4 embodiment of processor 70 (or 90) of FIG. 2, the processor includes one microblender (e.g., the upstream microblender of FIG. 4, with the output of unit 107 being connected directly to the input of emitter unit 102), or more than two microblenders (e.g., the upstream and downstream microblenders of FIG. 4 and at least one additional microblender, all connected in series between gatekeeper 100 and emitter 102).

Another embodiment of the invention is a method for pipelined pixel shading. The method includes the steps of:

generating a packet, wherein the packet is an ordered array of data values including an instruction pointer indicative of a pixel shading instruction;

asserting an instruction code in response to the instruction pointer;

generating updated data values by processing at least some of the data values in response to the instruction code, thereby executing the instruction determined by the instruction pointer; and generating an updated packet identical to the packet except in that the updated packet includes an updated instruction pointer in place of the instruction pointer, the updated packet includes the updated data values in place of corresponding ones of the data values, the updated packet optionally does not include places for data values that are no longer required, and the updated packet optionally includes new places for data values that may be required in subsequent processing.

Optionally, the method also includes the steps of:

generating control bits in response to the instruction code and determining at least one set of arguments in response to the instruction code and said at least some of the data values, wherein each said set of the arguments includes at least one of the data values;

generating at least one processed set of the arguments in response to each said set of the arguments and at least some of the control bits; and generating the updated data values in response to the least one processed set of the arguments.

The updated packet can include a condition code, and the updated instruction pointer can be indicative of a conditional instruction. At least one of the instruction pointer and the updated instruction pointer can be indicative of a jump, branch, loop, conditional jump, or conditional branch instruction.

Another embodiment of the invention is a method for pipelined pixel shading. The method includes the steps of:

generating a packet, wherein the packet is an ordered array of data values;

determining at least one texel by processing at least one texture coordinate of the packet;

generating an updated packet in response to the packet, wherein the updated packet is an ordered array of updated data values including an instruction pointer indicative of an instruction, and including each said texel;

asserting an instruction code in response to the instruction pointer;

generating further updated data values by processing at least some of the updated data values in response to the instruction code, thereby executing the instruction determined by the instruction pointer; and generating a further updated packet identical to the updated packet except in that the updated packet includes an updated instruction pointer in place of the instruction pointer, the further updated packet includes the further updated data values in place of corresponding ones of the updated data values, the further updated packet optionally does not include places for data values that are no longer required, and the further updated packet optionally includes new places for data values that may be required in subsequent processing.

The further updated packet can include a condition code, and the updated instruction pointer can be indicative of a conditional instruction. At least one of the instruction pointer and the updated instruction pointer can be indicative of a jump, branch, loop, conditional jump, or conditional branch instruction.

It should be understood that while certain forms of the invention have been illustrated and described herein, the invention is not to be limited to the specific embodiments described and shown or the specific methods described.

What is claimed is:

1. A pipelined pixel shader configured to process a packet in accordance with a program comprising instructions, wherein the packet is an ordered array of data values including an instruction pointer indicative of one of the instructions, the packet has a format, and the packet contains information, other than the instructions themselves, required for the pixel shader to process the packet, said pixel shader comprising:

a set of pipelined processing stages coupled and configured to perform pipelined processing operations on the packet such that the format of the packet output from each stage of the set is related to the format of the packet input to said stage, the packet output from each stage of the set includes an updated instruction pointer in place of the instruction pointer of the packet input to said stage, and the packet output from each stage of the set includes at least one updated data value in place of a corresponding one of the data values of the packet input to said stage.

2. The pixel shader of claim 1, wherein the format of the packet output from each stage of the set is identical to the format of the packet input to said stage.

3. The pixel shader of claim 1, wherein the packet input to each stage of the set comprises fields of data, and the stages are configured so that the format of the packet output from each stage of the set can differ from the format of the packet input to said stage by at least one of omission of at least one of the fields and inclusion of at least one additional field with the fields.

4. The pixel shader of claim 1, wherein each of the stages includes at least one pipelined instruction execution unit, and each said instruction execution unit has identical architecture.

5. The pixel shader of claim 4, wherein at least one of the stages includes a first pipelined instruction execution unit having an output, and a second pipelined instruction execution unit having an input coupled to the output of the first pipelined instruction execution unit, and wherein the second pipelined instruction execution unit is identical to the first pipelined instruction execution unit.

6. The pixel shader of claim 1, wherein the packet input to at least one of the stages includes a condition code and an instruction pointer indicative of a conditional instruction.

7. The pixel shader of claim 1, wherein the packet input to at least one of the stages includes an instruction pointer indicative of one of a jump, a branch, a loop, a conditional jump, and a conditional branch instruction.

8. The pixel shader of claim 1, wherein the packet contains at least substantially all information, other than the instructions themselves, required for the pixel shader to process the packet.

9. The pixel shader of claim 1, wherein the packet contains all information, other than the instructions themselves, required for the pixel shader to process the packet.

10. A pipelined pixel shader configured to receive and process a packet in accordance with a program comprising instructions, wherein the packet is an ordered array of data values including an instruction pointer indicative of one of the instructions, said pixel shader comprising:

a set of N processing stages for performing pipelined processing operations on the packet and at least one updated version of the packet, where N is an integer greater than one, each of the stages has an input and an output and is configured to assert at the output an updated version of the packet received at the input, each said updated version includes an updated instruction pointer in place of the instruction pointer and at least one updated data value in place of a corresponding one of the data values, each of the stages has architecture identical to that of each other one of the stages, and the pixel shader is operable to execute the program regardless of the value of N.

11. The pixel shader of claim 10, wherein each said updated version of the packet has format identical to the format of the packet received at the input of said each of the stages.

12. The pixel shader of claim 10, wherein each of the stages includes at least one pipelined instruction execution unit, and each said instruction execution unit has identical architecture.

13. The pixel shader of claim 12, wherein at least one of the stages includes a first pipelined instruction execution unit having an output, and a second pipelined instruction execution unit having an input coupled to the output of the first pipelined instruction execution unit, and wherein the second pipelined instruction execution unit is identical to the first pipelined instruction execution unit.

14. The pixel shader of claim 10, wherein at least one said updated version of the packet includes a condition code, and the updated instruction pointer of said updated version of the packet is indicative of a conditional instruction.

15. The pixel shader of claim 10, wherein at least one of the instruction pointer and the updated instruction pointer is indicative of one of a jump, a branch, a loop, a conditional jump, and a conditional branch instruction.

16. A pipelined pixel shader configured to receive and process a sequence of packets, wherein each packet in the sequence is an ordered array of data values including an instruction pointer indicative of an instruction, said pixel shader comprising:
    an instruction determination stage coupled to receive the instruction pointer of each packet and configured to assert an instruction code in response to each said instruction pointer;
    an instruction execution stage coupled to receive the instruction code and at least a subset of the data values of each packet, and configured to generate updated data values by processing at least some of the data values in response to the instruction code, thereby executing the instruction determined by the instruction pointer; and
    a destination stage, coupled to receive the updated data values and at least some of the data values and configured to assert an updated packet in response thereto, wherein at least one of the instruction determination stage, the instruction execution stage, and the destination stage is configured to generate an updated instruction pointer, and wherein the updated packet includes the, updated instruction pointer in place of the instruction pointer and the updated data values in place of corresponding ones of the data values.

17. The pixel shader of claim 16, wherein each said updated packet has format identical to the format of a packet received by the pixel shader.

18. The pixel shader of claim 16, wherein the instruction determination stage is configured to assert a first instruction code in response to each said instruction pointer having a first value and to assert the first instruction code in response to each said instruction-pointer having a second value, thereby implementing a mapping of N different ones of the instruction pointers to M different ones of the instruction codes, where N is greater than M.

19. The pixel shader of claim 16, wherein the instruction determination stage includes:
    a memory into which instruction codes can be loaded, and wherein the instruction determination stage is configured to retrieve from the memory one of the instruction codes that has been loaded into the memory in response to each said instruction pointer.

20. The pixel shader of claim 19, wherein the memory has capacity to store M different ones of the instruction codes, the instruction determination stage is configured to retrieve a first instruction code from the memory in response to each said instruction pointer having a first value and to retrieve the first instruction code from the memory in response to each said instruction pointer having a second value, thereby implementing a mapping of N different ones of the instruction pointers to M different ones of the instruction codes, where N is greater than M.

21. The pixel shader of claim 20, wherein the instruction determination stage also includes:
    a remap unit coupled and configured to receive each said instruction pointer and to assert an address to the memory in response to each said instruction pointer, wherein the memory is configured to retrieve one of the instruction codes from the memory in response to each said address.

22. The pixel shader of claim 19, wherein the memory is configured to store a set of constants and said instruction codes, and the instruction determination, stage is configured to retrieve one of the instruction codes and one of the constants from the memory in response to each said instruction pointer, and wherein the instruction execution stage is coupled to receive said one of the instruction codes, said one of the constants, and said at least some of the data values, and is configured to generate the updated data values by processing at least one argument selected from the data values and said one of the constants in response to said one of the instruction codes, thereby executing the instruction determined by the instruction pointer.

23. The pixel shader of claim 16, wherein the instruction execution stage includes:
    an argument selection and control bit generation stage coupled to receive the instruction code and said at least some of the data values, and configured to generate control bits in response to the instruction code and to assert at least one set of arguments in response to the instruction code and said at least some of the data values, wherein each said set of the arguments includes at least one of the data values;
    an input processing stage coupled to receive each said Set of the arguments and at least some of the control bits, and configured to assert at least one processed set of the arguments in response thereto;
    a math operation stage coupled to receive the at least one processed set of the arguments and at least some of the control bits, and configured to assert at least one further processed set of the arguments in response thereto; and
    an output processing stage coupled to receive the at least one further processed set of the arguments and at least some of the control bits, and configured to assert the updated data values in response thereto.

24. The pixel shader of claim 23, wherein the instruction determination stage is configured to assert at least one constant with the instruction code in response to each said instruction pointer,
    the argument selection and control bit generation stage is coupled to receive the instruction code, the at least one constant, and said at least some of the data values, and configured to assert the at least one set of arguments in response thereto, the at least one set of arguments includes a set of three arguments R0, R1, and R2, wherein R0 is a first selected one of the at least one constant and said at least some of the data values, R1 is a second selected one of the at least one constant and said at least some of the data values, and R2 is a third selected one of the at least one constant and said at least some of the data values, and the input processing stage is coupled to receive the arguments R0, R1, and R2 and at least some of the control bits, and configured to assert a set of three processed arguments ARG0, ARG1, and ARG2 in response thereto.

25. The pixel shader of claim 24, wherein at least some of the control bits asserted to the math operation stage determine whether the math operation stage performs a multiplication operation, ADD, a multiplication operation, MOLT, or a linear interpolation operation, LERP, on the arguments ARG0, ARG1, and ARG2.

26. The pixel shader of claim 25, wherein the math operation stage is configured to generate a value R in response to the arguments ARG0, ARG1, and ARG2 and said at least some of the control bits, where:

$$R=(MULT\ ?\ 0.0{:}ARG0)+(ARG1-(LERP\ ?\ ARG0{:}0.0))$$
$$*(ADD\ ?\ 1.0{:}ARG2).$$

27. The pixel shader of claim 16, wherein the instruction execution stage includes:

an argument selection and control bit generation stage coupled to receive the instruction code and said at least some of the data values, and configured to generate control bits in response to the instruction code and to assert at least one set of arguments in response to the instruction code and said at least some of the data values, wherein each said set of the arguments includes at least one of the data values; and a math operation stage coupled to receive the at least one set of arguments and at least some of the control bits, and configured to assert at least one processed set of the arguments in response thereto, and wherein the instruction determination stage is configured to assert at least one constant with the instruction code in response to each said instruction pointer, the argument selection and control bit generation stage is coupled to receive the instruction code, the at least one constant, and said at least some of the data values, and configured to assert the at least one set of arguments in response thereto, and the at least one set of arguments includes a set of the arguments ARG0, ARG1, and ARG2, wherein ARG0 is a first selected one of the at least one constant and said at least s9me of the data values, ARG1 is a second selected one of the at least one constant and said at least some of the data values, and ARG2 is a third selected one of the at least one constant and said at least some of the data values.

28. The pixel shader of claim 27, wherein at least some of the control bits asserted to the math operation stage determine whether the math operation stage performs a multiplication operation, ADD, a multiplication operation, MULT, or a linear interpolation operation, LERP, on the arguments ARG0, ARG1, and ARG2.

29. The pixel shader of claim 28, wherein the math operation stage is configured to generate a value R in response to the arguments ARG0, ARG1, and ARG2 and said at least some of the control bits, where:

$$R=(MULT\ ?\ 0.0{:}ARG0)+(ARG1-(LERP\ ?\ ARG0{:}0.0))$$
$$*(ADD\ ?\ 1.0{:}ARG2).$$

30. The pixel shader of claim 16, wherein the updated packet includes a condition code, and the updated instruction pointer is indicative of a conditional instruction.

31. The pixel shader of claim 16, wherein at least one of the instruction pointer and the updated instruction pointer is indicative of one of a jump, a branch, a loop, a conditional jump, and a conditional branch instruction.

32. A pipelined pixel shader configured to receive and process a sequence of packets, wherein each packet in the sequence is an ordered array of data values including an instruction pointer indicative of an instruction, said pixel shader comprising:

a gatekeeper having a first input coupled to receive each said packet, a second input, and an output;

a first instruction determination stage coupled to the output of the gatekeeper for receiving the instruction pointer of each packet asserted at the output of the gatekeeper, wherein the first instruction determination stage is configured to assert an instruction code in response to each said instruction pointer;

a first instruction execution stage coupled to receive the instruction code and to receive at least some of the data values of each packet asserted at the output of the gatekeeper, wherein the first instruction execution stage is configured to generate updated data values by processing at least a subset of the data values in response to the instruction code, thereby executing the instruction determined by the instruction pointer;

a. first destination stage, coupled to receive the updated data values and at least some of the data values of each packet asserted at the output of the gatekeeper, and configured to assert an updated packet in response thereto, wherein at least one of the first instruction determination stage, the first instruction execution stage and the first destination stage is configured to generate an updated instruction pointer, and wherein the updated packet includes the updated instruction pointer in place of the instruction pointer and the updated data values in place of corresponding ones of the data values;

a second instruction determination stage coupled to the first destination stage for receiving the updated instruction pointer of each updated packet asserted by the first destination stage, wherein the second instruction determination stage is configured to assert a second instruction code in response to each said updated instruction pointer;

a second instruction execution stage coupled to receive the second instruction code and to receive at least some of the data values of each updated packet asserted by the first destination stage, wherein the second instruction execution stage is configured to generate updated data values by processing at least a subset of said data values in response to the second instruction code, thereby executing the instruction determined by the updated instruction pointer; and a second destination stage, coupled to receive the updated data values generated by the second instruction execution stage and at least some of the data values of each updated packet asserted by the first destination stage, and configured to assert a further updated packet in response thereto, wherein at least one of the second instruction determination stage, the second instruction execution stage and the second destination stage is configured to generate a further updated instruction pointer, and wherein the further updated packet includes the further updated instruction pointer in place of the updated instruction pointer and the updated data values generated by the second instruction execution stage in place of corresponding ones of the data values of the updated packet.

33. The pixel shader of claim 32, wherein each said updated packet is identical to the packet corresponding thereto asserted at the output of the gatekeeper except in that the updated packet includes said updated instruction pointer in place of the instruction pointer and the said updated values in place of the corresponding ones of the data values.

34. The pixel shader of claim 32, also including:
a FIFO, having an input and an output, wherein the output of the FIFO is coupled to the second input of the gatekeeper for asserting the further updated packet to the gatekeeper; and
an emitter unit having an input coupled to the second destination stage for receiving the further updated packet, a first output coupled to the input of the FIFO for asserting the further updated packet to the FIFO, and a second output,
wherein the gatekeeper is configured to pass through to the first instruction determination stage, the first instruction execution stage, and the first destination stage, data values being asserted to a selected one of the first input of the gatekeeper and the second input of the gatekeeper.

35. The pixel shader of claim 32, wherein at least one said updated packet includes a condition code, the instruction executed by the second instruction execution stage is a conditional instruction, and the second instruction execution stage is configured to process the subset of the data values of the updated packet in response to the condition code and the second instruction code to generate the updated instruction values, thereby executing the conditional instruction.

36. The pixel shader of claim 32, wherein the instruction determined by the updated instruction pointer is one of a jump, a branch, a loop, a conditional jump, and a conditional branch instruction.

37. The pixel shader of claim 32, also including:
a pipelined texture generator having a texture generator output coupled to the first input of the gatekeeper, wherein the texture generator is coupled and configured to receive a preliminary version of each said packet, to extract at
least one texture coordinate from each said preliminary version of each said packet that includes at least one texture coordinate, to determine a texel identified by each said texture coordinate, and to assert at the texture generator output an updated version of each said preliminary version, wherein the updated version of each said preliminary version includes each said texel determined by the texture generator.

38. The pixel shader of claim 37, wherein the texture generator includes:
a texel generation pipeline coupled and configured to receive the preliminary version of each said packet and determine each said texel, and having an output at which each said texel is asserted;
a FIFO coupled and configured to receive at least some data values of the preliminary version of each said packet, the FIFO having an output at which the data values of the preliminary version of each said packet are asserted; and
a packet updating stage, coupled to the output of the texel generation pipeline and the output of the FIFO, and configured to assert the updated version of each said preliminary version in response to the data values asserted at the output of the FIFO and each said texel asserted at the output of the texel generation pipeline.

39. A pipelined pixel shader configured to receive and process a packet, wherein the packet is an ordered array of data values including an instruction pointer indicative of an instruction, wherein the pixel shader comprises:
a first pipelined texture subsystem having an input and an output;
a first pipelined processor, having an input coupled to the output of the first pipelined texture subsystem, and having an output;
a second pipelined texture subsystem, having an input coupled to the output of the first pipelined processor, and having an output; and
a second pipelined processor identical to the first pipelined processor, wherein the second pipelined processor has an input coupled to the output of the second pipelined texture subsystem, wherein the first pipelined texture subsystem is coupled and configured to receive the packet, to determine at least one texel identified by at least one texture coordinate in the packet, and to assert at the output of said first pipelined texture generator an updated version of the packet, wherein the updated version includes each said texel and an instruction pointer.

40. The pixel shader of claim 39, wherein the first pipelined processor is coupled and configured to receive the updated version of the packet, to assert at the output of the first pipelined processor a second updated version of the packet, said second updated version including an updated instruction pointer in place of the instruction pointer and at least one updated data value in place of a corresponding one of the data values of the updated version,
wherein the second pipelined texture subsystem is coupled and configured to receive the second updated version of the packet, to determine at least one texel identified by at least one texture coordinate in the second updated version of the packet, and to assert at the output of said second pipelined texture generator a third updated version of the packet, w11erein the third updated version includes each said texel determined by the second pipelined texture subsystem and an instruction pointer, and
wherein the second pipelined processor is coupled and configured to receive the third updated version of the packet, to assert at the output of the second pipelined processor a fourth updated version of the packet, said fourth updated version including an updated instruction pointer in place of the instruction pointer of the third updated version and at least one updated data value in place of a corresponding one of the data values of the third updated version.

41. The pixel shader of claim 40, wherein at least one of the second
updated version of the packet and the fourth updated version of the packet includes a condition code, and the updated instruction pointer of said one of the second updated version of the packet and the fourth updated version of the packet is indicative of a conditional instruction.

42. The pixel shader of claim 40, wherein at least one of each said instruction pointer and each said updated instruction pointer is indicative of one of a jump, a branch, a loop, a conditional jump, and a conditional branch instruction.

43. A pipelined microblender configured to receive and process a sequence of packets, wherein each packet in the sequence is an ordered array of data values including an instruction pointer indicative of a pixel shading instruction, said microblender comprising:
an instruction determination stage coupled to receive the instruction pointer of each packet and configured to assert an instruction code in response to each said instruction pointer;
an instruction execution stage coupled to receive the instruction code and at least a subset of the data values of each packet, and configured to generate updated data values by processing at least some of the data values in response to the instruction code, thereby executing the instruction determined by the instruction pointer; and
a destination stage-, coupled to receive the updated data values and at least some of the data values and configured to assert an updated packet in response thereto, wherein at least one of the instruction determination stage, the instruction execution stage, and the destination stage is configured to generate an updated instruction pointer, and wherein the updated packet includes the updated instruction pointer in place of the instruction pointer and the updated data values in place of corresponding ones of the data values.

44. The microblender of claim 43, wherein the instruction execution stage includes:
an argument selection and control bit generation stage coupled to receive the instruction code and said at least some of the data values, and configured to generate control bits in response to the instruction code and to assert at least one set of arguments in response to the instruction code and said at least some of the data values, wherein each said set of the arguments includes at least one of the data values;
an input processing stage coupled to receive each said set of the arguments and at least some of the control bits, and configured to assert at least one processed set of the arguments in response thereto;
a math operation stage coupled to receive the at least one processed set of the arguments and at least some of the control bits, and configured to assert at least one further processed set of the arguments in response thereto; and
an output processing stage coupled to receive the at least one further processed set of the arguments and at least some of the control bits, and configured to assert the updated data values in response thereto.

45. A pipelined texture generator configured to receive and process a sequence of packets, wherein each packet in the sequence is an ordered array of data values including an instruction pointer: indicative of a pixel shading instruction, said texture generator comprising:
a texel generation pipeline coupled and configured to determine at least one texel identified by at least one texture coordinate in each packet that includes at least one texture coordinate, wherein the texel generation pipeline has an output and is configured to assert each said texel at the output;
a FIFO coupled and configured to receive and pass through at least some data values of each said packet; and a packet updating stage, coupled to the output of the texel generation pipeline, coupled to receive the data values passed through the FIFO, and
configured to assert an updated version of each said packet in response to said data values and each said texel asserted at the output of the texel generation pipeline.

46. A graphics processor, comprising:
a rasterizer configured to assert a sequence of packets, wherein each packet in the sequence is an ordered array of data values including an instruction pointer; and
a pipelined pixel shader configured to receive" and process said each packet in accordance with a program comprising instructions, wherein the instruction pointer of said each packet is indicative of one of the instructions, wherein said pixel shader comprises
a set of N processing stages for performing pipelined processing operations on said each packet and at least one updated version of said each packet, wherein N is an integer greater than two, each of the stages has an input and an output and is configured to assert at the output an updated version of a packet received at the input, each said updated version includes an updated instruction pointer in place of the instruction pointer and at least one updated data value in place of a corresponding one of the data values, each of the stages has architecture identical to that of each other one of the stages, and the pixel shader is operable to execute the program regardless of the value of N.

47. The graphics processor of claim 46, wherein at least one of the stages of the pixel shader includes a first pipelined instruction execution unit having an output, and a second pipelined instruction execution unit having an input coupled to the output of the first pipelined instruction execution unit, and wherein the second pipelined instruction execution unit is identical to the first pipelined instruction execution unit.

48. The graphics processor of claim 46, wherein at least one said updated version of the packet includes a condition code, and the updated instruction pointer of said updated version of the packet is indicative of a conditional instruction.

49. The graphics processor of claim 46, wherein at least one of the instruction pointer and the updated instruction pointer is indicative of one of a jump, a branch, a loop, a conditional jump, and a conditional branch instruction.

50. A graphics processor, comprising:
a rasterizer configured to assert a sequence of packets, wherein each packet in the sequence is an ordered array of data values including an instruction pointer; and
a pipelined pixel shader configured to receive and process said each packet in accordance with a program consisting of instructions, wherein the instruction pointer of said each packet is indicative of one of the instructions, wherein said pixel shader comprises:
an instruction determination stage coupled to receive the instruction pointer of said each packet and configured to assert an instruction code in response to each said instruction pointer;
an instruction execution stage coupled to receive the instruction code and at least a subset of the data values of said each packet, and configured to generate updated data values by processing at least some of the data values in response to the instruction code, thereby executing the instruction determined by the instruction pointer; and
a destination stage, coupled to receive the updated data values and at least some of the data values and configured to assert an updated packet in response thereto, wherein at least one of the instruction determination stage, the instruction execution stage, and the destination stage is configured to generate an updated instruction pointer, and wherein the updated packet includes the updated instruction pointer in place of the instruction pointer and the updated data values in place of corresponding ones of the data values.

51. The graphics processor of claim 50, wherein the instruction determination stage is configured to assert a first instruction code in response to each said instruction pointer having a first value and to assert the first instruction code in response to each said instruction pointer having a second value, thereby implementing a mapping of N different ones of the instruction pointers to M different ones of the instruction codes, where N is greater than M.

52. The graphics processor of claim 50, wherein the instruction execution stage includes:
   an argument selection and control bit generation stage coupled to receive the instruction code and said at least some of the data values, and configured to generate control bits in response to the instruction code and to assert at least one set of arguments in response to the instruction code and said at least some of the data values, wherein each said-set of the arguments includes at least one of the data values;
   an input processing stage coupled to receive each said set of the arguments and at least some of the control bits, and configured to assert at least one processed set of the arguments in response thereto;
   a math operation stage coupled to receive the at least one processed set of the arguments and at least some of the control bits, and configured to assert at least one further processed set of the arguments in response thereto; and
   an output processing stage coupled to receive the at least one further processed set of the arguments and at least some of the control bits, and configured to assert the updated data values in response thereto.

53. The graphics processor of claim 50, wherein at least one said updated packet includes a condition code, and the updated instruction pointer of said updated packet is indicative of a conditional instruction.

54. The graphics processor of claim 50, wherein at least one of the instruction pointer and the updated instruction pointier is indicative of one of a jump, a branch, a loop, a conditional jump, and a conditional branch instruction.

55. A method for pipelined pixel shading, including the steps of:
   generating a packet, wherein the packet is an ordered array of data values including an instruction pointer indicative of a pixel shading instruction;
   asserting an instruction code in response to the instruction pointer;
   generating updated data values by processing at least some of the data values in response to the instruction code, thereby executing the instruction determined by the instruction pointer; and
   generating an updated packet that includes an updated instruction pointer in place of the instruction pointer and the updated data values in place of corresponding ones of the data values.

56. The method of claim 55, wherein the updated packet is identical to the packet except in that the updated packet includes said updated instruction pointer in place of the instruction pointer and said updated data values in place of said corresponding ones of the data values.

57. The method of claim 55, also including the steps of:
   generating control bits in response to the instruction code and determining at least one set of arguments in response to the instruction code and said at least some of the data values, wherein each said set of the arguments includes at least one of the data values;
   generating at least one processed set of the arguments in response to each said set of the arguments and at least some of the control bits; and
   generating the updated data values in response to the at least one processed set of the arguments.

58. The method of claim 55, wherein the updated packet includes a condition code, and the updated instruction pointer is indicative of a conditional instruction.

59. The method of claim 55, wherein at least one of the instruction pointer and the updated instruction pointer is indicative of one of a jump, a branch, a loop, a conditional jump, and a conditional branch instruction.

60. A method for pipelined pixel shading, said method including the steps of:
   generating a packet, wherein the packet is an ordered array of data values;
   determining at least one texel by processing at least one texture coordinate of the packet;
   generating an updated packet in response to the packet, wherein the updated packet is an ordered array of updated data values including an instruction pointer indicative of an instruction, and including each said texel;
   asserting an instruction code in response to the instruction pointer;
   generating further updated data values by processing at least some of the updated data values in response to the instruction code, thereby executing the instruction determined by the instruction pointer; and
   generating a further updated packet that includes an updated instruction pointer in place of the instruction pointer and the further updated data values in place of corresponding ones of the updated data values.

61. The method of claim 60, wherein the further updated packet is identical to the updated packet except in that the further updated packet includes said updated instruction pointer in place of the instruction pointer and said further updated data values in place of said corresponding ones of the updated data values.

62. The method of claim 60, wherein the further updated packet includes a condition code, and the updated instruction pointer is indicative of a conditional instruction.

63. The method of claim 60, wherein at least one of the instruction pointer and the updated instruction pointer is indicative of one of a jump, a branch, a loop, a conditional jump, and a conditional branch instruction.

64. The pixel shader of claim 1, wherein the packet contains all information, other than the instructions themselves, necessary for the pixel shader to process the packet.

* * * * *

UNITED STATES PATENT AND TRADEMARK OFFICE
CERTIFICATE OF CORRECTION

PATENT NO. : 6,980,209 B1
APPLICATION NO. : 10/172174
DATED : December 27, 2005
INVENTOR(S) : Christopher D. S. Donham et al.

It is certified that error appears in the above-identified patent and that said Letters Patent is hereby corrected as shown below:

In column 22, Claim 23, line 50, after "said", please delete "Set" and insert --set--.

In column 23, Claim 27, line 52, end the paragraph after "and" and begin a new paragraph with "the".

In column 23, Claim 27, line 55, please delete "s9me" and insert --some--.

In column 26, Claim 40, line 47, please delete "w1 1erein" and insert --wherein--.

In column 27, Claim 43, line 20, please delete "stage-," and insert --stage,--.

In column 28, Claim 46, line 12, please delete """]" after "receive".

Signed and Sealed this

Twelfth Day of December, 2006

JON W. DUDAS
*Director of the United States Patent and Trademark Office*